United States Patent Office 2,940,963
Patented June 14, 1960

2,940,963
QUENCHING OF CATALYST WITH ALCOHOLIC MIXTURE

George S. Denkowski, Texas City, Tex., assignor to Monsanto Chemical Company, St. Louis, Mo., a corporation of Delaware No Drawing. Filed June 25, 1956, Ser. No. 593,342

3 Claims. (Cl. 260—94.9)

This invention relates to the polymerization of ethylene. More particularly, it pertains to improvements in the Ziegler process for the production of polyethylene, pertaining specifically to the use of a mixture of alkyl alcohols containing methanol for quenching the catalyst.

There has recently come into commercial prominence a process whereby ethylene and other polymerizable hydrocarbons may be polymerized at low temperatures and pressures to yield products of high molecular weight superior in many respects to those produced by the high pressure techniques previously practiced in the art. This process has been made possible through the agency of a type of catalyst developed by Dr. Karl Ziegler of the Max Planck Institute at Mulheim an der Ruhr, Germany, and has come to be commonly termed the "Ziegler process" while the products so produced are as commonly referred to as "Ziegler-type polymers." Many variations of the catalyst have been disclosed but probably the preferred group is that described in Belgian Patent No. 533,362, issued May 16, 1955, to Ziegler, the disclosure of which is incorporated herein by reference, namely, catalysts prepared by the interaction of a trialkylaluminum with a compound of a metal of group IV–B, V–B, or VI–B of the periodic system including thorium and uranium, and especially compounds of titanium, zirconium and chromium.

As the process is ordinarily conducted, the catalyst is suspended in kerosene, or some other suitable liquid organic medium or inert solvent, and ethylene is bubbled through the system at a temperature anywhere in the range from 0° to 100° C. After the polymerization reaction is complete, the polymer is recovered by first destroying the catalyst by quenching it with isobutanol or some other alkyl alcohol and then separating the solid polymer from the reaction mixture by filtration. While this process ordinarily results in a good yield of a high molecular weight polyethylene of satisfactory quality, frequently, and particularly at the higher catalyst concentrations required to make polymer having a high melt index, the polyethylene produce does not possess the desirable whiteness demanded by the trade, but is very highly colored.

It has now been discovered that the color of the polyethylene produced by the Ziegler process can be considerably improved if, after the polymerization reaction is complete and prior to any substantial removal of the polymerized material from the reaction mixture, the catalyst is quenched with a mixture of alkyl alcohols one of which is methanol at a temperature in the range from 65°–75° C. This is true not only in the case of polymerization of ethylene by itself but also holds good in polymerizations where ethylene is modified by the addition of another polymerizable hydrocarbon such as propylene, for example.

It is an object of the invention, therefore, to provide an improvement in the Ziegler process for the production of polyethylene having a white color superior to that of the polymer presently produced by the conventional techniques in the art.

Other objects and advantages will become apparent from the following description and examples of specific embodiments of the invention.

According to the invention, ethylene is polymerized in the presence of a Ziegler-type catalyst suspended in an inert organic medium. After the polymerization reaction is complete and before the polyethylene is removed from the reaction mixture, a mixture of alkyl alcohols containing methanol as one component is added to the reaction mixture to quench the catalyst. The whole may then be filtered or centrifuged to separate the solid polymer which is then washed free of all quenching agent and catalyst residues and dried.

The following examples are presented to illustrate the invention but are not to be construed as limiting it in any manner except as it is limited in the appended claims.

Example 1

The polymerization reaction was carried out in a closed cylindrical glass reactor equipped with a dip tube, a stirrer, a dropping funnel, a thermometer, and gas inlet means to provide for flushing the reactor with an inert gas prior to introduction of the reactants and to maintain an inert atmosphere during the polymerization reaction itself. External heating and cooling was provided by means of a heating mantle or ice bath fitted to the reactor.

The reactor was charged with about 1000 ml. of freshly distilled kerosene after it had been thoroughly dried and flushed with a hot nitrogen sweep gas for about 3 hours. To this by way of the dropping funnel was added 8.258 g. (10.7 ml.) of a 30.1% solution of triisobutylaluminum in kerosene. The dropping funnel was flushed with 100 ml. of kerosene and charged with 7.91 g. of titanium tetrachloride which was then added dropwise to the reactor with agitation. The funnel was again flushed with another 100 ml. of kerosene. The mole ratio of triisobutylaluminum to titanium tetrachloride in the reactor was 0.300 and the catalyst concentration in the kerosene was approximately 1.2% by weight.

The catalyst mixture in the reactor was heated to 65° C. and ethylene was introduced into it through the dip tube for a period of about 50 minutes at a rate varying from about 850 cc. per minute to about 3000 cc. per minute. The catalyst was then quenched by adding to the reaction mixture 200 ml. of isobutanol and heating the mixture to a temperature between 95 and 100° C. and maintaining it in that range for a period of about 2 hr. The mixture was then cooled to about 20° C. and filtered in the absence of air. The filter cake was washed three times with 250 ml. portions of isobutanol. The cake was then oven dried at 60° C. and 60 mm. Hg. The yield of dry polyethylene was 122.2 g. The product had a melt index of 5.8 and a color of +15.6. Color determination was made by spectrophotometric means which measures degree of yellowness. The lower the value obtained, the less yellow is the sample. Satisfactory commercial material has a zero value.

Example 2

Another run was made employing substantially the same conditions of temperature, catalyst concentration, aluminum-titanium molar ratio, flow rates, etc., as given in Example 1 for the polymerization reaction. Instead of quenching the catalyst with isobutanol, however, after the polymerization reaction was complete, the reaction mixture was cooled to about 58° C. and 400 ml. of a 1:1 volume mixture of isobutanol and methanol was added to it. The resulting mixture was heated to a temperature of about 64–66° C. and held at that temperature for about 1.5 hr. after which it was cooled and filtered.

The filter cake was washed three times with 250 ml. portions of the same mixture used for quenching and then dried. About 118.0 g. of dry polyethylene was obtained having a melt index of 7.7 and a color of −3.4. The whiteness of this sample as indicated by the color value is decidedly superior to that of the product made in Example 1.

*Example 3*

The same reactor employed in Example 1 was used in this experiment and was charged with 1000 ml. of kerosene after it had been thoroughly dried and purged. To this there was added 6.38 g. (8.2 ml.) of a 30.1% solution of triisobutylaluminum in kerosene from the dropping funnel. The funnel was flushed with kerosene (100 ml.) and charged with 3.43 g. (1.98 ml.) of titanium tetrachloride which was then added dropwise to the reactor. Again, the funnel was flushed with 100 ml. of kerosene. The mole ratio of aluminum to titanium in the reactor was 0.4995 and the catalyst concentration in the kerosene was 0.59% by weight.

The catalyst suspension was heated to 65° C. and ethylene premixed with propylene was admitted into it through a dip tube for a period of about 56 min. Propylene from a cylinder was admitted through a rotometer into a gas absorption bottle where it was premixed with the ethylene feed, also controlled by means of a rotometer. The rotometers were adjusted so that the concentration of propylene in the ethylene stream was maintained at a level of about 0.9% by weight. Flow rate of the combined stream varied from about 800 cc. per minute to a maximum of about 3000 cc. per minute depending upon the rate of absorption. The contents of the reactor were stirred continuously throughout the polymerization period.

After polymerization was complete, 200 ml. of isobutanol was added to the reaction mixture to quench the catalyst and the resulting mixture was heated to a temperature between 95–100° C. and maintained at that temperature for a period of about 1.5 hours. The mixture was then cooled to 20° C. and filtered in the absence of air. The filter cake was washed twice with 250 ml. portions of isobutanol and was then dried under vacuum. The resulting polymer had a melt index of 1.95 and a color value of +5.1.

*Example 4*

Ethylene admixed with 1% propylene was polymerized in the same manner and under the same conditions as are set out in Example 3 above. After the polymerization reaction was complete, the catalyst was quenched in this case, however, with 400 ml. of a 1:1 volume mixture of isobutanol and methanol, the temperature being maintained at about 71° C. throughout the one-hour quenching period. A condenser was also attached to the reactor to prevent the loss of methanol therefrom. The subsequent filtration and drying steps were carried out as in Example 3 except that the filter cake was washed three times with 250 ml. portions of the isobutanol-methanol mixture (1:1 volume ratio). The polyethylene thus made (yield 130.0 g.) had a melt index of 2.8 but a color value of −12.3, which represented a marked improvement in whiteness over the product of Example 3. Obviously, the combination of methanol with isobutanol produces a quenching agent which is more effective than the isobutanol alone in separating from the polymer the catalyst residues which contribute to color contamination. This is not only an unexpected but an important contribution to the art in view of the rigidity of specifications set up on polyethylene to be used in various applications.

Many variations may be made in the process of the invention without departing from the scope thereof. For example, the catalyst composition can be varied substantially from that described. In addition to the type of catalyst disclosed in the examples in the Belgian Patent No. 533,362 mentioned earlier, other catalysts of the Ziegler type which differ in various ways from this one may be employed. For example, instead of or in addition to the aluminum trialkyls, catalysts of the type described in the Belgian patent can be made by reacting the various metal compounds of groups IV–B, V–B, and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihydrides, alkyl or aryl aluminum dialkoxy or diaryloxy compounds, dialkyl or diaryl aluminum alkoxy or aryloxy compounds. Similarly, instead of or in addition to the organo-aluminum compounds, organic compounds of magnesium or zinc can be used and these can contain either one or two hydrocarbon radicals, those of special interest being Grignard compounds, magnesium dialkyls, mixed organo zinc compounds such as $C_2H_5ZnI$ and zinc dialkyls, all of these, of course, being reacted with compounds of groups IV–B, V–B, or VI–B metals.

Another Ziegler-type catalyst is prepared by the interaction of an aluminum compound of the general formula $R_2AlX$ where R is a hydrocarbon radical such as alkyl or aryl and X is a halogen, such as chlorine or bromine, with a compound of a metal of group VIII of the periodic system, such as iron, nickel, cobalt, platinum or manganese, for example, dimethylaluminum monobromide plus ferric chloride, diisobutylaluminum chloride plus nickel (trivalent) chloride, diethylaluminum monochloride plus manganic chloride. Yet another combination is that of group IV–B, V–B, or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler-type polymerization catalysts comprises compounds of the group IV–B, V–B, or VI–B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc; for example, butyl lithium plus zirconium tetrachloride, sodium tetramethylaluminum plus titanium tetrachloride or plus thorium acetylacetonate. Still other Ziegler-type catalysts are prepared by using (in conjunction with compounds of group IV–B, V–B, or VI–B metals), instead of trialkylaluminums, triaryl-, triarylalkyl-, trialkaryl-, or mixed alkyl-, and aryl- aluminum, zinc, magnesium or alkali metals, e.g., phenyl sodium plus $TiCl_4$.

While the principal classes of Ziegler catalysts have been listed, this listing is not to be construed as complete, and various other such catalysts than those set forth may also be used in the process in which the improvement described in the present application is applicable. Thus, ethylene and other monomers can be polymerized by catalysts obtained by treating compounds of heavy metals, especially compounds of the group IV–B, V–B, and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminum dihydrides, and the various other catalysts disclosed by Ziegler in U.S. Patent No. 2,699,457. Attention is further directed to the teaching of various of the foregoing catalysts in Ziegler's Belgian Patents 534,792 and 534,888, the disclosures of which are hereby incorporated herein by reference. The essence of the present invention, however, is not to be found in the particular Ziegler-type catalyst employed in making the polymers but rather in the use of a mixture of alkyl alcohols containing methanol as the catalyst quenching agent.

The preferred catalysts are prepared by the interaction of (a) an aluminum compound of the general formula $R_2AlX$ wherein R is an alkyl, cycloalkyl, or aryl radical and X is hydrogen, halogen, or an alkyl, cycloalkyl, or aryl radical with (b) a metal halide selected from the group consisting of the chlorides, bromides, and iodides of titanium and zirconium.

By way of example, but not limitation, the following suitable aluminum compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-($\beta$-phenylethyl)aluminum
Diethylaluminum chloride
Diisobutylaluminum chloride
Diisobutylaluminum iodide
Di-($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri-, and tetrahalides, etc., can be used. Preferred titanium or zirconium compounds are those that are soluble in the organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides. However, such compounds are usually prepared from the halides and, hence, are more costly, and also are usually less active, so their use is economically sound only where in a particular situation, favorable effects can be obtained such as increased solubility in the organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valance by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mole ratio between 1:3 and 5:1. The same ratios apply in the case of zirconium compounds.

While active catalysts can be prepared by a variety of procedures, the simplest and perhaps most effective is to add the titanium or zirconium halide to the aluminum compound, preferably in the presence of comparatively small amounts of an inert organic solvent used as the catalyst suspending medium. The reverse order of addition of reactants can also be used. In addition to kerosene, such solvents can suitably be saturated aliphatic and alicyclic, and aromatic hydrocarbons, halogenated hydrocarbons, and saturated ethers. By way of example may be mentioned liquefied propane, isobutane, n-butane, n-hexane, the various isomeric hexanes, cyclohexane, methylcyclopentane, dimethylcyclohexane, dodecane, industrial solvents composed of saturated and/or aromatic hydrocarbons such as kerosenes, naphthas, etc., especially when hydrogenated to remove any olefinic compounds, and especially those ranging in boiling point up to 600° F. Also benzene, toluene, ethylbenzene, cumene, decalin, ethylene dichloride, diethyl ether, dibutyl ether, and the like may be used.

The quantity of solvent used in the reaction mixture is subject to substantial variation. The amount of the solvent may be kept low in the reaction mixture, such as from 0.1 to 0.5 part by weight of inert organic solvent (i.e., inert to the reactants and catalyst under the conditions employed) per part by weight of total polymer produced. However, it is often helpful in obtaining sufficient contact between monomer and catalyst and in aiding removal of heat of reaction to employ larger amounts of solvent, for example, from 5 to 30 parts by weight of solvent per part by weight of total polymer produced.

The amount of catalyst required is comparatively small. Amounts as small as 0.01 weight percent based on total weight of monomer charged are sometimes permissible, although it is usually desirable to use in the neighborhood of 0.1 to 5.0 percent. Larger amounts up to, say, 20 percent or higher are also satisfactory.

The ethylene is contacted with the catalyst in any convenient manner, preferably merely by bringing the catalyst and monomer together with intimate agitation provided by suitable stirring or other means. The agitation can be continued during the polymerization, or the polymerization mixture can be allowed to remain quiescent while the polymerization takes place. The catalyst is sensitive to various poisons among which may be mentioned oxygen, water, sulfur, carbon dioxide, carbon monoxide, and acetylenic compounds. For this reason, suitable precaution should be taken to protect the catalyst and the reaction mixture from such materials.

The polymerization reaction can be effected over a wide range of temperatures, such as from 0° C. to 100° C. and higher if desired. It is seldom advantageous, however, to exceed temperatures of about 70° C. during the polymerization reaction, and room temperature (25° C.) is quite satisfactory.

The reaction is suitably carried out at atmospheric pressure or higher. Although sub-atmospheric pressures are permissible, there would seldom be any advantage in their use. Pressures ranging from atmospheric up to several hundred or even many thousand pounds per square inch, e.g., 50,000 p.s.i. and higher, are suitable. While it is not necessary to use the higher pressures in order to obtain reaction, they will have at times a desirable effect on reaction rate and in some instances on polymer quality. The choice of whether or not to use an appreciably elevated pressure will be one of economic and practical considerations, taking into account the advantages that can be gained thereby.

After the polymerization is complete, prior to the separation of the polymer from the reaction mixture and before any poisons have contacted the catalyst, the catalyst is destroyed by addition of an alcohol to the reaction mixture. The prior art teaches that any alcohol can be used for this purpose although alkyl alcohols are said to produce the best results with those containing 1 to 8 carbon atoms being designated as satisfactory and those containing from 3 to 8 carbon atoms being particularly preferred. Alcohols characterized as useful, for example, are methyl alcohol, propyl alcohol, n-butyl alcohol, isobutyl alcohol, tertbutyl alcohol, hexyl alcohol, heptyl alcohol, n-octyl alcohol, iso-octyl alcohol, 2-ethylhexyl alcohol, ethylene glycol, triethylene glycol, propylene glycol, benzyl alcohol, methyl phenyl carbinol, and the like. It has now been determined, however, that a mixture containing any one of these suitable alcohols together with methanol is a more effective quenching agent than any of the alcohols themselves used singly. The use of such a mixture invariably leads to a polymer product having distinctly better color. The amount of methanol to be employed in the alcoholic mixture depends upon the solvent employed for the polymerization reaction. It is desirable during the quenching step to maintain the liquid phase of the reaction mixture in a homogeneous state, hence, the amount of methanol is limited by the miscibility of methanol with the particular catalyst suspending medium. In every case, the maximum amount of methanol which can be tolerated while still maintaining the homogeneity of the solvent mixture is employed. Volume-wise, the amount of methanol in the alcoholic mixture thus varies from about 10 to about 90%. In the case of isobutanolmethanol mixtures, for example, optimum results are achieved with a mixture containing 50% methanol or a 1:1 mixture.

While the amount of the mixed-alcohol quenching agent used to destroy the catalyst is subject to wide variation, it is necessary in order to obtain thorough intermixture to use a considerable excess over that theoretically required to react with the catalyst. Thus, from about 20 ml. of the alcoholic mixture to about 200 ml. per gram of catalyst employed can be used. It is generally preferred to use from about 30 ml. per gram of catalyst to about 100 ml. per gram or, expressed on a weight basis of polymer made, an amount of the alcoholic mixture several times the weight of the polymer being treated is employed. A sufficient amount of the alcoholic mixture to form a readily stirrable slurry is desirable. In the quenching operation, the temperature is maintained at any point within the broad range from 0 to 100° C. Preferably, the temperature is controlled from about 65° to 75° C.

After the catalyst destruction is complete, the polymer can be removed from the reaction mixture by any convenient method and this is best accomplished by filtration and preferably in the absence of air. After the polymer is removed from the reaction mixture, it is washed with a suitable solvent in order to remove final traces of the suspending medium and catalyst residues. Ordinarily and for practical reasons, the alkyl alcohol used for quenching is also used for this purpose although it need not be, other alkyl alcohols and common solvents being also useful. However, best results are obtained when the same material used for quenching the catalyst is employed for washing the filter cake. In the process of the invention, therefore, optimum results are obtained by washing the polymer with the same mixture of alcohols containing methanol that is used for quenching. After the catalyst is thoroughly washed, it is dried by any convenient method.

As is evident from the examples, the invention is not limited to the polymerization of ethylene alone but is applicable as well in polymerizations wherein ethylene is admixed with other olefinic compounds such as propylene, butene-1, butene-2, isobutylene, butadiene, styrene, and then polymerized. The resulting copolymers are characterized by an improvement in color comparable to that obtained in the polyethylene produced by the process of the invention.

What is claimed is:

1. An improved process for the production of polyethylene which comprises polymerizing ethylene in the presence of a catalyst prepared by the interaction of a trialkylaluminum with titanium tetrachloride, said catalyst being suspended in kerosene, reacting the catalyst at a temperature within the range from about 65° to about 75° C. after the polymerization has taken place and before any substantial removal of the polymer from the reaction mixture with a mixture of isobutanol and methanol in such proportions that it contains from about 10% to about 90% by volume of methanol and in an amount in the range from about 20 ml. to about 200 ml. of said alcoholic mixture per gram of catalyst, and recovering polyethylene from the reaction mixture.

2. An improved process for the production of polyethylene which comprises polymerizing ethylene in the presence of a catalyst prepared by the interaction of a triisobutylaluminum with titanium tetrachloride, said catalyst being suspended in kerosene, reacting the catalyst after the polymerization has taken place and before any substantial removal of the polymer from the reaction mixture with a mixture of isobutanol and methanol in such proportions that it contains about 50% by volume of methanol at a temperature within the range from about 65 to about 75° C. and in an amount in the range from about 20 ml. to about 200 ml. of said alcoholic mixture per gram of catalyst, recovering polyethylene from the reaction mixture by filtration, washing said polyethylene with a mixture of isobutanol and methanol, and drying said polyethylene.

3. An improved process for the production of propylene-modified polyethylene which comprises polymerizing ethylene containing from about 0.5% to about 10% by weight of propylene in the presence of a catalyst prepared by the interaction of a triisobutyl aluminum with titanium tetrachloride, said catalyst being suspended in kerosene, reacting the catalyst after the polymerization has taken place and before any substantial removal of the polymer from the reaction mixture with a mixture of isobutanol and methanol in such proportions that it contains about 50% by volume of methanol at a temperature within the range from about 65 to about 75° C. and in an amount in the range from about 20 ml. to about 200 ml. of said alcoholic mixture per gram of catalyst, recovering polyethylene from the reaction mixture by filtration, washing said polyethylene with a mixture of isobutanol and methanol, and drying said polyethylene.

References Cited in the file of this patent

UNITED STATES PATENTS

| | | |
|---|---|---|
| 2,683,139 | Leary et al. | July 6, 1954 |
| 2,691,008 | Grim | Oct. 5, 1954 |
| 2,827,447 | Nowlin et al. | Mar. 18, 1958 |
| 2,874,153 | Bowman et al. | Feb. 17, 1959 |

FOREIGN PATENTS

| | | |
|---|---|---|
| 533,362 | Belgium | May 16, 1955 |